Dec. 31, 1946.  R. G. BROWN  2,413,485
RECIPROCATING-SAW MACHINE
Filed Oct. 11, 1944  7 Sheets-Sheet 1

Inventor
Rush G. Brown
By Clarence A. O'Brien
and Harvey B. Jacobson
Attorneys

Dec. 31, 1946.  R. G. BROWN  2,413,485
RECIPROCATING-SAW MACHINE
Filed Oct. 11, 1944  7 Sheets-Sheet 2

Inventor
Rush G. Brown
By Clarence A. O'Brien
and Harvey B. Jackson
Attorneys

Dec. 31, 1946.  R. G. BROWN  2,413,485
RECIPROCATING-SAW MACHINE
Filed Oct. 11, 1944　　7 Sheets-Sheet 4

Fig. 6.

Inventor
Rush G. Brown
By Clarence A. O'Brien
and Harvey B. Jacobson
Attorneys

Fig. 7.

Patented Dec. 31, 1946

2,413,485

UNITED STATES PATENT OFFICE 2,413,485

RECIPROCATING-SAW MACHINE

Rush G. Brown, Riverton, Wyo.

Application October 11, 1944, Serial No. 558,177

6 Claims. (Cl. 143—63)

1

This invention relates to improvements in reciprocating-saw machines, and an object of the invention is to provide a portable machine of this kind which is especially suitable for use in felling trees and cutting the felled trees into logs of suitable length.

A further object of the present invention is to provide an efficient sawing mechanism including a reciprocating saw and adapted to be installed upon the front end of an agricultural tractor and to be driven from the power take-off shaft of said tractor.

A more specific object of the present invention is to provide a sawing mechanism of the above kind having improved driving and supporting means for the saw which eliminates the necessity of providing a crosshead and guide rods for the saw and imparts a longitudinal rocking motion to the saw while reciprocating the latter so as to attain a more efficient sawing action.

Still another object of the present invention is to provide improved means for mounting the sawing mechanism upon the tractor whereby the saw may be readily raised or lowered to position the same at the desired distance from the ground, and whereby the saw may be readily turned about a horizontal axis to position it for vertical, horizontal or angular cutting.

A still further object of the present invention is to provide a driving means for the saw-operating mechanism including an automatic safety release clutch for disconnecting said mechanism from the source of power when reciprocation of the saw is unduly resisted, thereby avoiding damage to the saw or its operating mechanism.

More specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a fragmentary top plan view, partly broken away, of a tractor equipped with a sawing mechanism constructed in accordance with the present invention, the rear portion of the tractor being omitted.

Figure 1—a is a plan view of the rear portion of the tractor shown in Figure 1; this view, together with Figure 1, shows substantially the complete machine.

2

Figure 14 is a side elevation looking to the right of Figures 1 and 1a.

Figure 6:
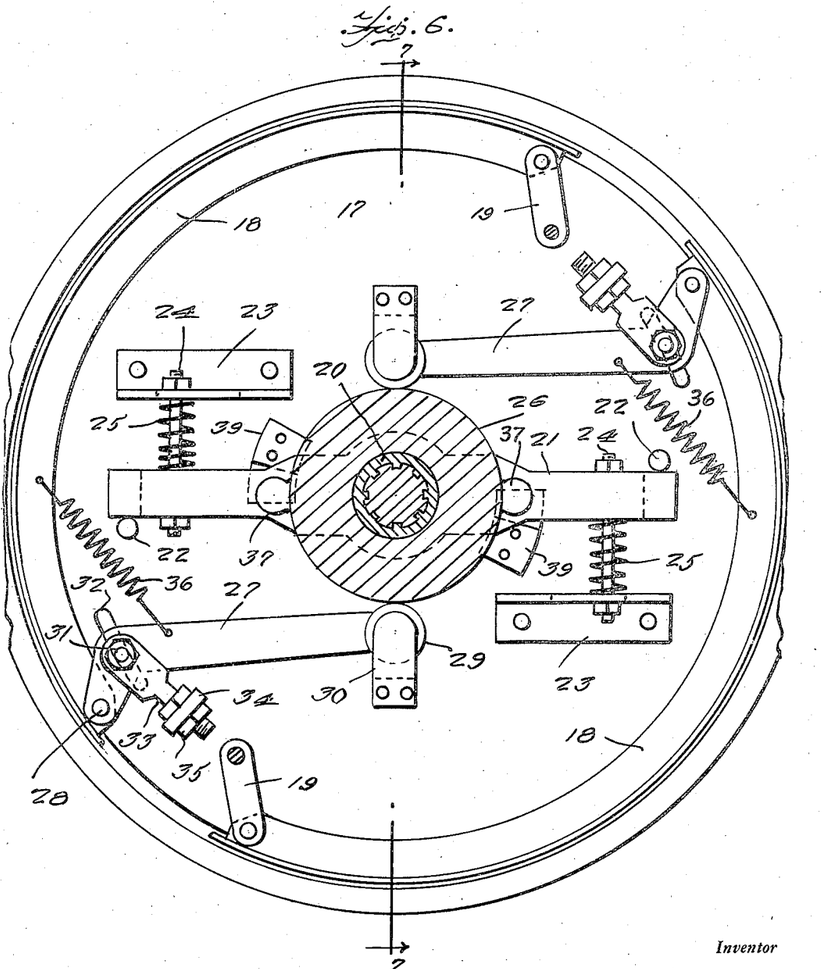
Figure 6 is an enlarged section taken substantially on the plane of line 6—6 of Figure 1 and showing details of construction of the combined driving pulley and safety release clutch.
Figure 7:
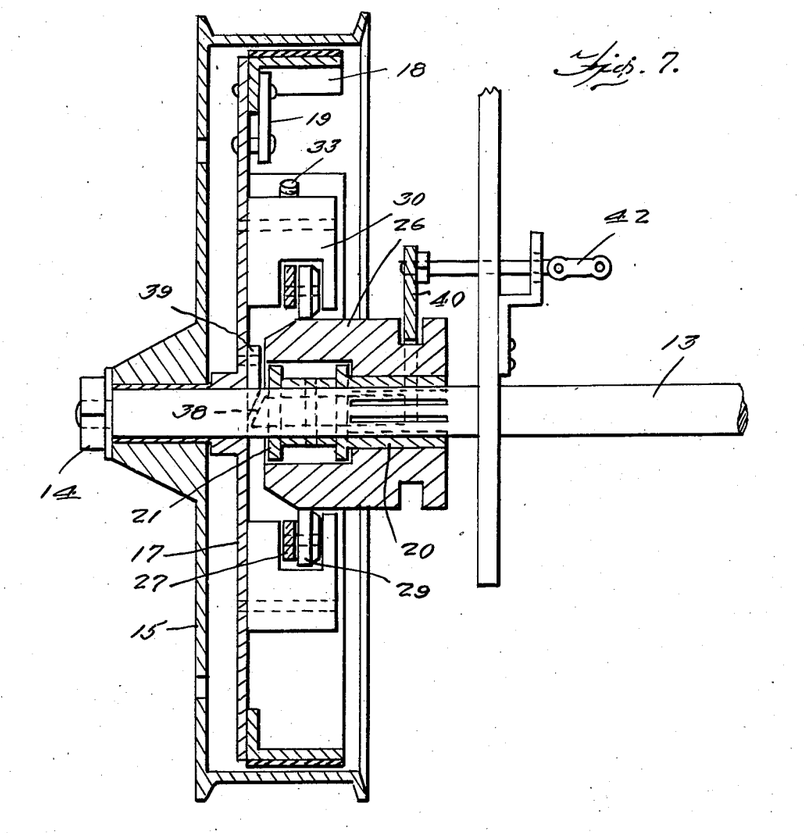
Figure 7 is a section taken on line 7—7 of Figure 6.

Referring in detail to the drawings, 5 indicates a conventional agricultural tractor having a laterally projecting power take-off shaft 6 at one side thereof on which is secured a driving pulley 7. Rigidly secured to and projecting forwardly from the tractor 5 at the forward end of the latter are mounting bars or brackets 8 carrying a transverse horizontal shaft 9 at their forward ends. The shaft 9 projects at the side at which the power take-off shaft 6 is located, and journaled on this projecting end of shaft 9 is a double pulley 10, one portion of which accommodates an endless driving belt 11 that also passes around the pulley 7 of the shaft 6. Pivoted at its rear end upon the shaft 9 is a frame 12 in the forward end of which is journaled a transverse horizontal shaft 13 constituting the drive shaft of the sawing mechanism to be later described and which is supported by the frame 12. Journaled on one end of shaft 13 and retained on the latter by a nut 14 is a pulley 15. A second endless driving belt 16 passes around the other or remaining portion of double pulley 10 and also about the pulley 15 for driving the latter. As shown more clearly in Figures 6 and 7, the pulley 15 is hollow and forms the drum of a safety release clutch. This clutch includes a disc 17 arranged within pulley 15 and journaled on shaft 13. Arranged at the inner side of disc 17 adjacent the periphery of the latter and in position to engage the inner surface of the annular wall of pulley 15 are brake shoes 18. The brake shoes 18 are connected at corresponding ends to the disc 17 by links 19. Splined on shaft 13 at the inner side of disc 17 is the hub 20 of a driving spider or cross bar 21 whose turning movement in one direction relative to disc 17 is limited by stop pins 22 fixed to and projecting laterally from said disc 17. Fixed to disc 17 respectively above and below opposite ends of spider or bar 21 are angle brackets 23, and passing through the brackets 23 and the opposite ends of spider or bar 21 are bolts 24 on which are disposed helical compression springs 25 that are interposed between the respective brackets 23 and the corresponding ends of spider or bar 21. The springs 25 thus yieldingly resist turning movement of spider or bar 21 in the direction wherein the ends of said spider or bar 21 move away from stop pins 22. Stated differently, the springs 25 provide a yielding driving connection between spider 21 and disc 17 and are retained in place by the bolts 24. Slidable on the hub 20 of spider 21 is an actuating cone 26 for pivoted brake shoe operating levers 27 whose outer shorter arms are pivoted at 28 to the remaining or free ends of brake shoes 18. The longer arms of levers 27 carry at their inner ends rollers 29 that bear upon opposite sides of cone 26 and are guided in brackets 30. The pivots 31 of levers 27 are carried by disc 17 and are adjustable in elongated slots 32 of said disc 17 to provide for adjustment of the brake shoes, which adjustment is effected by means of screws 33 hinged on the pivots 31 and movable through ears 34 rigid with and projecting laterally from disc 17, locking and adjusting nuts 35 being threaded on screws 33 at opposite sides of ears 34. Helical tension springs 36 connect the inner longer arms of levers 27 with the respective brake shoes 18 and act to normally yieldingly release said brake shoes. On the other hand, movement of cone 26 toward disc 17 causes actuation of levers 27 in a direction to apply the brake shoes 18 or to cause the latter to move into engagement with the annular wall of pulley 15. As shown in Figure 7, the cone 26 is slotted to straddle the intermediate portion of spider 21, and fixed to opposite sides of cone 26 are pins 37 (Fig. 6) that are slidable through the spider 21 and have beveled inner ends 38 (Figure 7). Fixed to disc 17 are cam plates 39 in the path of which the pins 37 are disposed. Thus, should rotation of shaft 13 be resisted to an extent sufficient to cause compression of springs 25, disc 17 will be caused to turn with pulley 15 by the previously applied brake shoes 18 and cam plates 39 will ride under pins 37 so as to cause movement of cone 26 away from disc 17. This shifts the tapered part of cone 26 toward the plane of rollers 29, thereby permitting swinging of levers 27 by springs 36 in a direction to release the brake shoes and permit free turning of pulley 15 relative to shaft 13. Thus, a simple and efficient safety release clutch is provided between the pulley 15 and shaft 13. In order that the driving connection between pulley 15 and shaft 13 may be manually released, the cone 26 has a shifting fork 40 operatively connected at 42 with an operating lever 43 that is pivoted upon a torque tube 44 through which shaft 13 extends (see Fig. 1). Obviously, when cone 26 is moved toward the disc 17 to the position of Figure 7, the levers 27 will be actuated to apply the brake shoes. The cone 26 is illustrated in Figure 6 as shifted to the position wherein release of the brake shoes is permitted under the influence of springs 36.

Figures 2, 5, 8:
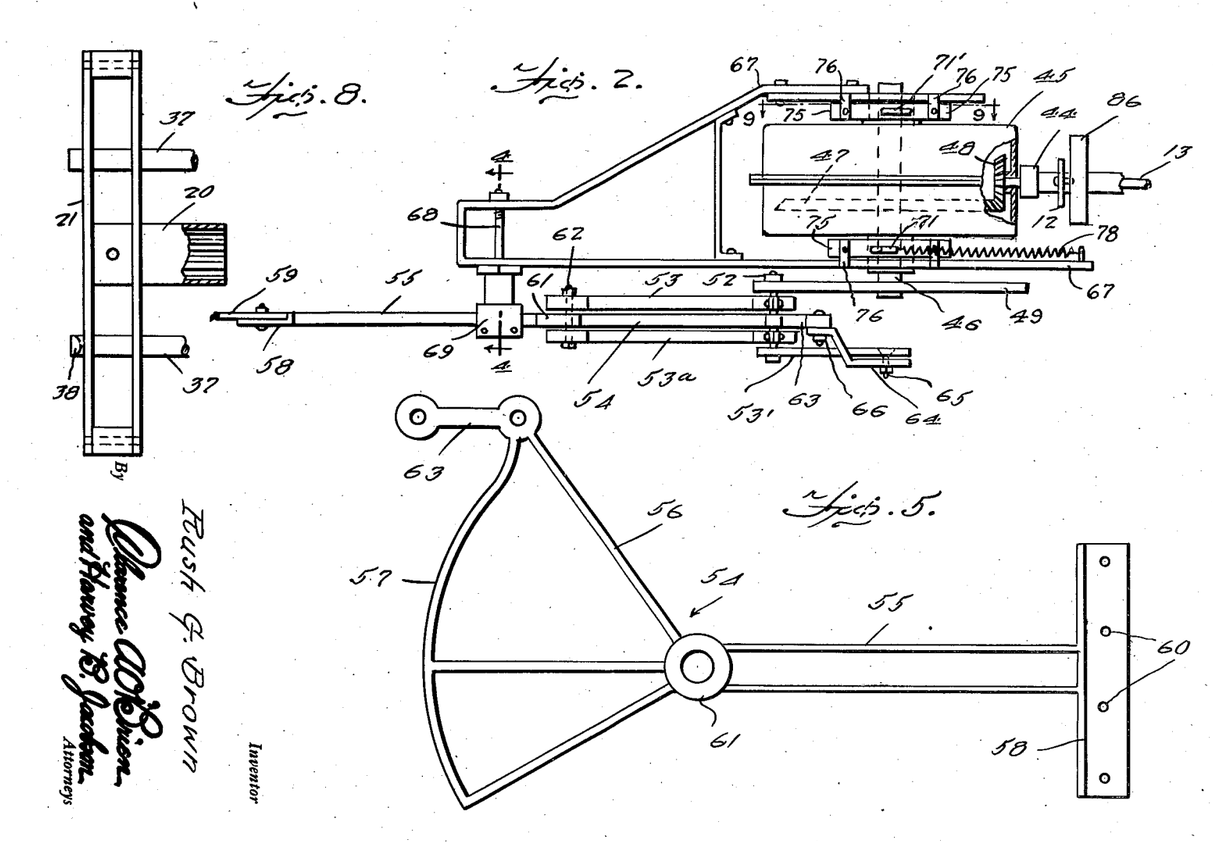
Figure 2 is a fragmentary elevational view of the saw and its operating mechanism, as seen looking in a downward direction with respect to Figure 1.
Figure 5 is an enlarged plan view of the saw propeller frame.
Figure 8 is a plan view, partly broken away and in section, of the driving spider forming part of the pulley and clutch of Figures 6 and 7.
Figures 3, 4, 9:
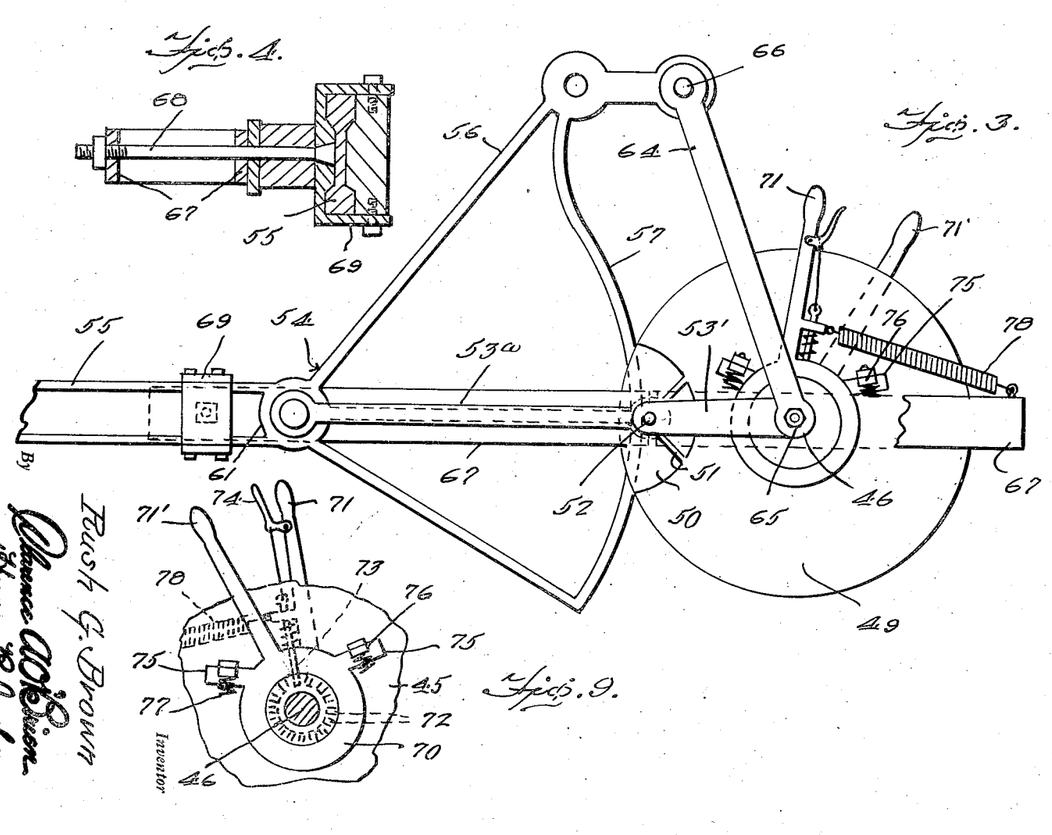
Figure 3 is an enlarged fragmentary bottom plan view of the construction shown in Figure 2.
Figure 4 is an enlarged transverse vertical section taken on line 4—4 of Figure 2.
Figure 9 is an enlarged fragmentary section taken substantially upon line 9—9 of Figure 2.

The torque tube 44 is journaled in frame 12 and fixed at one end to a gear casing 45 located at the side of frame 12 remote from pulley 15. Gear casing 45 is relatively flat and of circular form, and journaled centrally in and extending through the casing 45 is a shaft 46 on which is secured a bevel gear 47 that meshes with a pinion 48 secured on the adjacent end of shaft 13 (see Fig. 2). Secured on a projecting end of shaft 46 is a saw-driving disc 49 (Fig. 3) which is provided in its outer side with a marginal recess 50 that makes the disc lighter at this point and gives said disc a counterbalancing action. Within recess 50, disc 49 is formed with a pivot bearing and reinforcing ribs 51 radiating from said bearing. Fitted in this bearing is one end of a wrist pin 52 on which are pivoted corresponding ends of a pair of connecting rods 53 and 53a. One end of a crank arm 53' is secured on the other end of wrist pin 52. A saw propeller frame 54 is disposed on a plane between the connecting rods 53 and 53a, and this frame includes a rod 55 formed at one end with an open quadrant 56 that includes a radius bar 57 disposed to be substantially contacted at its outer side by the portion of wrist pin 52 exposed between the connecting rods 53 and 53a. At its other end, rod 55 is provided with a crosshead 58 to which is adapted to be bolted the inner end of an ordinary reciprocating saw 59. The head 58 is made relatively long and provided with a number of apertures 60 so that the position of the saw may be adjusted transversely of rod 55. At the point where the bar 55 joins with the quadrant 56, the frame 54 is formed with a bearing 61 that receives a pivot pin 62 for the other or remaining ends of connecting rods 53 and 53a. The quadrant is provided at one side, and beyond one end of the radius bar 57, with an arm 63 that extends in a direction opposite the bar 55 and to the free end of which is pivoted a link 64. The other end of link 64 is pivoted at 65 to the inner end of crank arm 53', and the pivotal connection between link 64 and arm 63 is indicated at 66. It will be noted that the crank arm 53' is shorter than the distance between crank pin 52 and shaft 46. Also, the pivot 65 is offset slightly to one side of the shaft 46, as indicated in Figure 3. Thus, as the disc 49 revolves, link 64 is forced upward, as viewed in Figure 3, and stays up until the saw reaches the end of its outward stroke. The link 64 is then moved downward of the return stroke of the saw, and in this way the saw is given a slight longitudinal rocking motion while it is reciprocated so as to give a more efficient sawing action. When this motion and reciprocation of the saw takes place, the link 64 simply swings back and forth about the pivot 65.

Hinged on center bearings of gear casing 45 at opposite sides of the latter are the corresponding ends of spaced members 67 of an elongated strap metal frame that extends parallel with the bar 55 of the saw propeller frame and toward the head 58 of the latter. The outer end portion of this frame is narrow and rotatably receives a pivot pin 68 from which depends a guide 69 through which the bar 55 of frame 54 slidably extends. Also pivoted on the center bearings of case 45 at opposite sides of the latter are the hubs 70 of levers 71 and 71' (see Figs. 2 and 9). These center bearings of case 45 are provided with circumferential series of sockets 72 adapted for selective reception of the spring-actuated locking bolts 73 of levers 71 and 71'. The bolts 73 have suitable actuating means 74 for disengaging or withdrawing them from the sockets 72. Rigid with and projecting from opposite sides of the hubs 70 are arms 75 which carry stop members 76 provided with shock absorbing springs 77. The springs 77 are positioned to engage the adjacent frame member 67 at opposite sides of the pivot of frame 67, and a helical tension spring 78 connects the inner end of frame 67 with lever 71. The arms 75 are disposed at an obtuse angle to each other and one spring 77 is always spaced from the frame 67. Thus, limited swinging movement of frame 67 is permitted relative to levers 71 and 71' to permit feeding movement of the saw through the work but to limit such feeding movement as determined by the adjustments of levers 71 and 71' relative to the case 45. If the lever 71 is inadvertently released when the saw completes a cut through a log, the lever 71' will prevent the saw from falling to the ground. The downward limit of movement and upward limit of movement of the saw under such conditions may be varied by simply disengaging the bolts 73 from sockets 72 and then rocking the levers 71 and 71' about the center bearings of the case 45. It will thus be seen that the saw and its propeller frame are effectively hung and guided without the use of a crosshead and guide rods. Also, the saw is permitted limited movement for feeding through the work and will have the longitudinal rocking action previously described.

Figures 1, 1A:
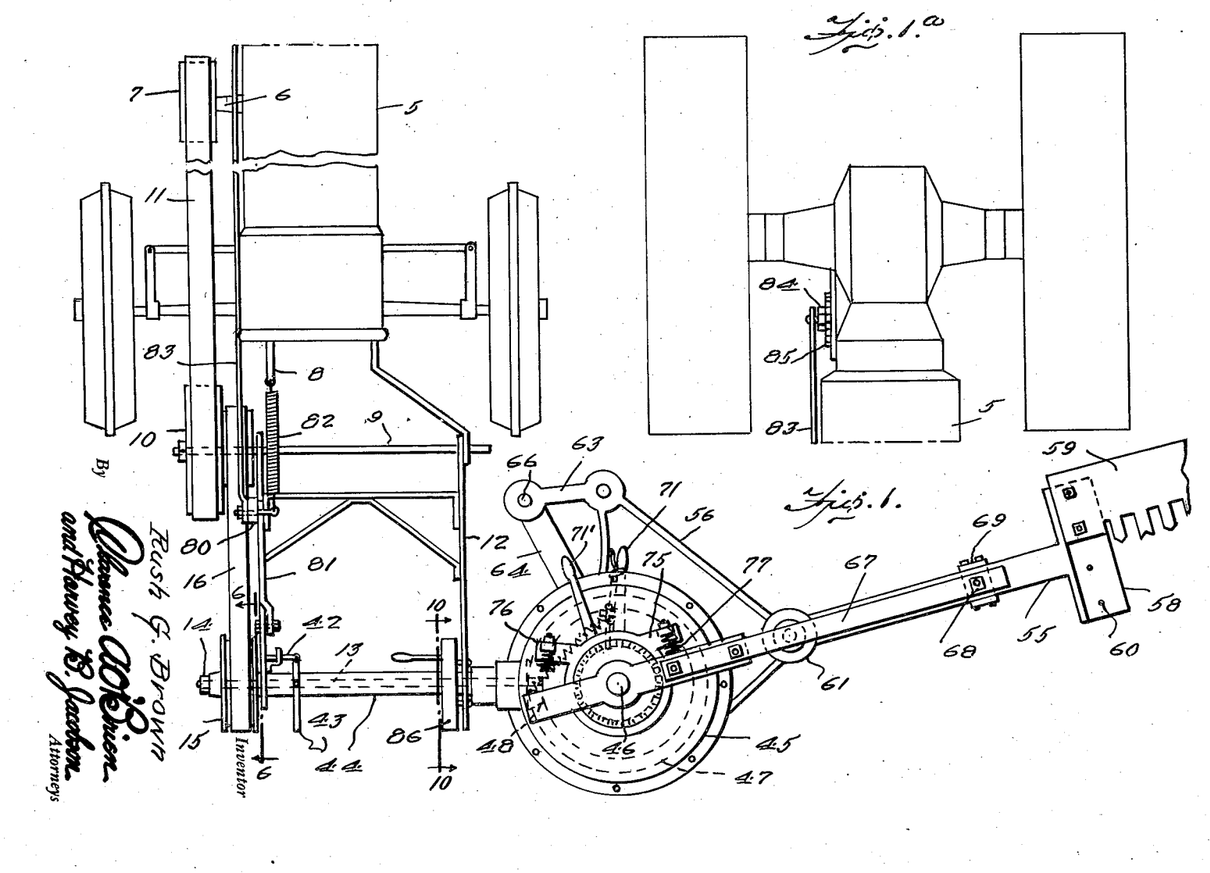
Figure 14:
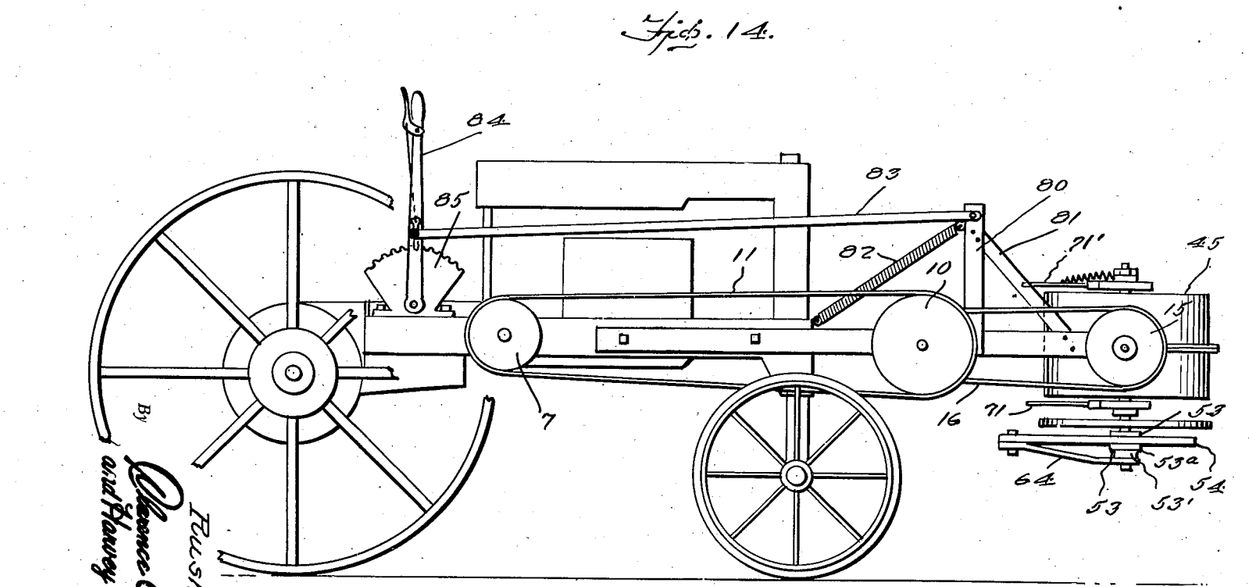

Means is provided to vertically swing the frame 12 and to secure the latter in any desired vertically adjusted position so as to support the saw at the required elevation. For this purpose, frame 12 is provided at one side and forwardly of its pivot shaft 9 with an upright 80 (Fig. 14) that is braced in a position substantially at right angles to the associated side member of frame 12 by means of a brace 81 extending from the forward portion of this side frame member rearwardly and upwardly to the upper end portion of upright 80. A strong helical tension spring 82 connects the upper end of upright 80 with the adjacent supporting bar 8 rearwardly of shaft 9 to counterbalance the frame 12 and parts carried thereby so that little effort will be required to raise and lower frame 12 to vertically adjust the same. Connected to the upper portion of upright 80, at its forward end, is a rod or operating bar 83 which extends rearwardly along the adjacent side of the tractor 5 and is connected at its rear end with a hand lever 84 having conventional latching mechanism cooperating with a rack segment, as shown generally at 85 in Figures 1—a and 14. Lever 84 is thus located beside the driver's seat of the tractor, not shown, in position for convenient actuation. By pulling rearwardly on lever 84, frame 12 is caused to swing upwardly, and by moving lever 84 forwardly, frame 12 is caused to lower. By engaging the latch of lever 84 with segment 85, the frame 12 may be retained in any of its vertically adjusted positions, as will be apparent.

Figures 10, 11, 12, 13:
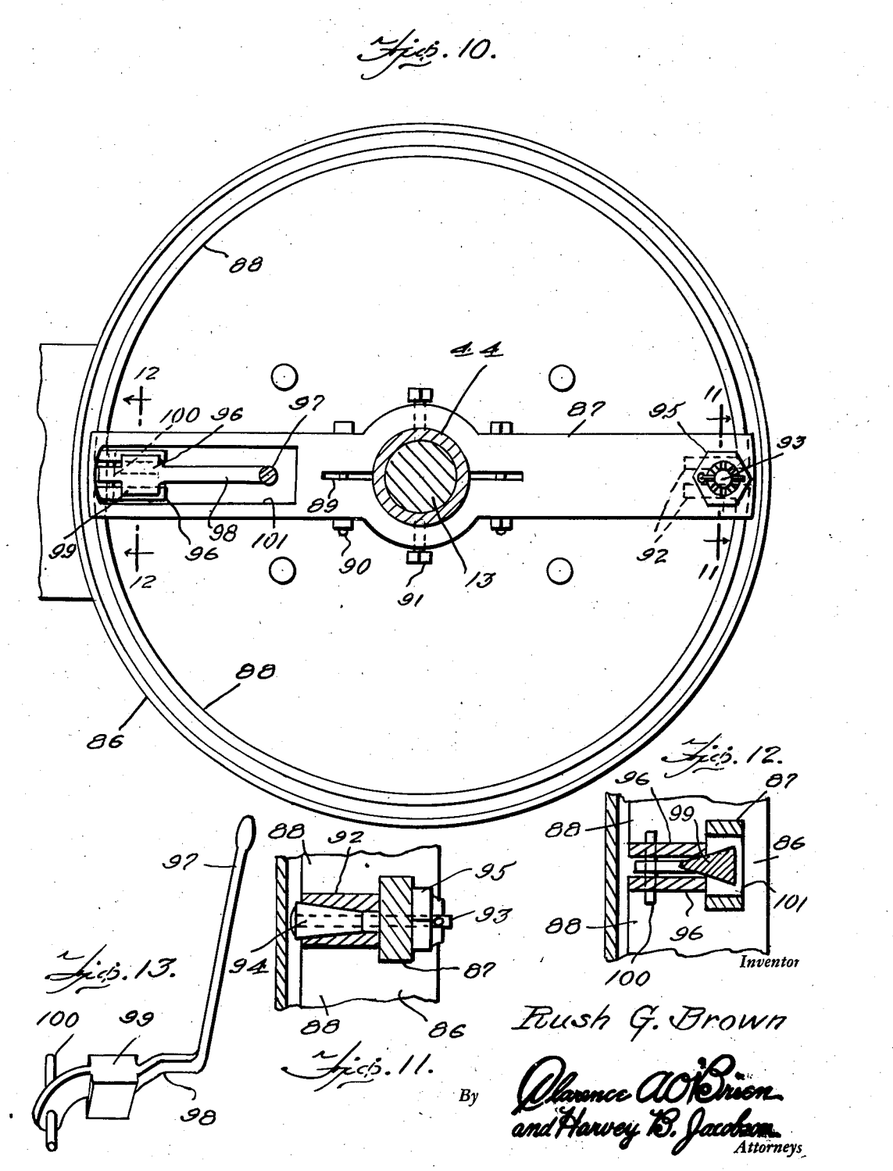
Figure 10 is an enlarged section taken on line 10—10 of Figure 1.
Figure 11 is an enlarged fragmentary section taken on line 11—11 of Figure 10.
Figure 12 is an enlarged fragmentary section taken on line 12—12 of Figure 10.
Figure 13 is a perspective view of the brake shoe actuating lever and wedge forming part of the device shown in Figure 10.

Securely riveted or bolted to the side member of frame 12, adjacent the gear casing 45, is a brake drum 86 (Fig. 1), and fitted on the torque tube 44 within drum 86, as shown in Figure 10, is a spider 87 carrying a pair of brake shoes 88 adapted and arranged to be expanded into engagement with the annular peripheral wall of drum 86. The intermediate portion of spider 87 is slotted at 89 and bolts 90 are provided to draw the slotted portion of the spider 87 into tight engagement with torque tube 44 for rotation therewith. Set screws 91 may also be provided to additionally securely fasten the spider 87 on torque tube 44 for turning with the latter. At one side of brake drum 86, the brake shoes 88 have inturned ends 92 (Fig. 11), and passing between and extending transversely of these ends 92 is a bolt 93 having a wedge 94 thereon. Bolt 93 also extends through spider 87 and projects beyond the side of the latter remote from the brake shoes where it has a nut 95 threaded thereon. Obviously, by tightening nut 95, the wedge 94 may be drawn between the ends 92 of the brake shoes so as to adjust the latter in proper relation to the brake drum from time to time as found necessary. At the opposite side of brake drum 86, brake shoes 88 also have inturned ends 96 (Fig. 12) and pivoted between these inturned ends 96 is one end of a lever 97 (Fig. 13) having a lateral arm 98 at its inner end formed with a wedge member 99. The free end of arm 98 carries a cross pin 100 that is loosely disposed in openings of the inturned ends 96 of the brake shoes, whereby lever 97 is effectively pivoted to the ends 96 while permitting relative movement of the latter toward or away from each other. The arm 98 of lever 97 is movable in a slot 101 of spider 87, and it will be apparent that when the lever 97 is swung to the position of Figures 1 and 10, parallel with shaft 13, the wedge 99 will be forced between the ends 96 of the brake shoes to expand the latter into engagement with the drum 86 and thereby prevent rotation of torque tube 44. On the other hand, when lever 96 is swung in the opposite direction to a position substantially at right angles to torque tube 44, the wedge 99 will have been withdrawn from between the ends 96 of the brake shoes so as to permit release of the latter from the drum 86 and thereby permit turning of the torque tube 44. When the brake is thus released, the lever 97 may be utilized to turn tube 44 and casing 45 so as to position saw 59 for vertical cutting, horizontal cutting or angular cutting, as desired. After the saw has been set in the desired position, it may be retained in the said position by swinging the lever 97 to the position of Figures 1 and 10 and thereby expanding brake shoes 88 into engagement with drum 86. The brake shoes 88 may be tensioned to contract when the wedge 99 is withdrawn from between the ends 96, or suitable springs may be utilized to contract and release the brake shoes as desired and as is conventional in the art of brakes.

In operation, the machine is driven to the desired point of operation, whereupon the saw 59 is vertically adjusted as required by operation of lever 84. The tube 44 and casing 45 are then turned about the axis of tube 44 to position the saw for the proper direction of cut. Levers 71 and 71' are then swung in a direction toward the saw after the latter has been initially engaged with the work, thereby placing spring 78 under tension and yieldingly swinging the frame 67 and the saw toward the work. The clutch associated with pulley 15 is then engaged so as to communicate motion to shaft 13 from pulley 7 through the gearing described, which motion is in turn transmitted to the saw 59 for reciprocating the latter by means of the mechanism previously described and including the saw propeller frame 54. As the sawing operation continues, spring 78 causes the saw to feed through the work, new adjustments of levers 71 and 71' being made from time to time if necessary and to keep the spring 78 under tension until the sawing operation is completed. In the case of vertical cutting, the saw is prevented from dropping to the ground by swinging of frame 67 into engagement with the stops 76 at the left side of Figure 1, sudden dropping of the saw upon completion of the cut being absorbed by the springs 77 carried by these stops.

From the foregoing description, it is believed that the construction and operation, as well as the advantages, of the present invention will be readily understood and appreciated by those skilled in the art. Minor changes in details of construction illustrated and described are contemplated, such as fall within the spirit and scope of the invention as claimed.

What I claim is:

1. In a reciprocating-saw machine, a driven shaft, a supporting frame pivotally mounted for swinging movement about said shaft, a driving disc secured on one end of said shaft, an eccentric wrist pin carried by said driving disc, a saw propeller frame comprising a bar having an open quadrant at one end including a radius bar, a pivoted guide for said first-named bar carried by said supporting frame, a connecting rod pivoted at one end on the wrist pin and at the other end to the inner end of said first-named bar, a crank arm carried by said wrist pin and extending to a point short of and to one side of said driven shaft, said quadrant having a rigid arm projecting toward said driven shaft, a link connecting said arm to the end of the crank arm nearest the driven shaft, said wrist pin being in guiding contact with the outer side of said radius bar, and means to secure a reciprocating saw to the outer end of said first-named bar.

2. In a reciprocating-saw machine, a driven shaft, a supporting frame pivotally mounted for swinging movement about said shaft, a driving disc secured on one end of said shaft, an eccentric wrist pin carried by said driving disc, a saw propeller frame comprising a bar having an open quadrant at one end including a radius bar, a pivoted guide for said first-named bar carried by said supporting frame, a connecting rod pivoted at one end on the wrist pin and at the other end to the inner end of said first-named bar, a crank arm carried by said wrist pin and extending to a point short of and to one side of said driven shaft, said quadrant having a rigid arm projecting toward said driven shaft, a link connecting said arm to the end of the crank arm nearest the driven shaft, said wrist pin being in guiding contact with the outer side of said radius bar, and means to secure a reciprocating saw to the outer end of said first-named bar, supporting means for said driven shaft, a lever rotatably mounted on said supporting means concentric with the driven shaft, locking means for releasably securing the lever in different rotatably adjusted positions relative to said supporting means, stops carried by the lever and alternately engageable with the supporting frame at opposite sides of the driven shaft for limiting swinging movement of the supporting frame, and a tension spring connecting the lever with the supporting frame to yieldingly swing the latter in a direction to feed the saw to the work.

3. In a reciprocating-saw machine, a driven shaft, a supporting frame pivotally mounted for swinging movement about said shaft, a driving disc secured on one end of said shaft, an eccentric wrist pin carried by said driving disc, a saw propeller frame comprising a bar having an open quadrant at one end including a radius bar, a pivoted guide for said first-named bar carried by said supporting frame, a connecting rod pivoted at one end on the wrist pin and at the other end to the inner end of said first-named bar, a crank arm carried by said wrist pin and extending to a point short of and to one side of said driven shaft, said quadrant having a rigid arm projecting toward said driven shaft, a link connecting said arm to the end of the crank arm nearest the driven shaft, said wrist pin being in guiding contact with the outer side of said radius bar, and means to secure a reciprocating saw to the outer end of said first-named bar, supporting means for said driven shaft, a lever rotatably mounted on said supporting means concentric with the driven shaft, locking means for releasably securing the lever in different rotatably adjusted positions relative to said supporting means, stops carried by the lever and alternately engageable with the supporting frame at opposite sides of the driven shaft for limiting swinging movement of the supporting frame, and a tension spring connecting the lever with the supporting frame to yieldingly swing the latter in a direction to feed the saw to the work, a vertically adjustable frame, said supporting means for the driven shaft including a torque tube rotatably carried by the last-named frame whereby the saw may be turned for cutting vertically or horizontally or at an angle between the horizontal and vertical, and brake means associated with the vertically adjustable frame and the torque tube for releasably securing the latter in any desired rotatably adjusted position.

4. The construction defined in claim 3, wherein the supporting means for the driven shaft includes a gear casing fixed to one end of said torque tube, a driving shaft journaled in and extending through said torque tube and operatively geared to the driven shaft within said gear casing, and power-operated driving means for the driving shaft including a driving pulley and safety release clutch means between said pulley and said last-named shaft.

5. In combination with a tractor having a lateral power take-off shaft, supporting bars rigidly carried by the forward end of and projecting forwardly from the tractor, a vertically swinging frame pivoted at its rear end upon the forward ends of said supporting bars upon a transverse axis, a double pulley journaled on said axis, belt gearing between one portion of said double pulley and said power take-off shaft, a transverse shaft journaled in the forward end of said frame and carrying a further pulley, belt gearing between said further pulley and the remaining portion of said double pulley, a torque tube journaled in said frame and having a projecting end at one side of the latter, a gear casing carried by the projecting end of said torque tube, said transverse shaft being journaled in said torque tube and projecting into the gear casing, a transverse driven shaft carried by said gear casing, gearing in said gear casing operatively connecting the last-named shaft with the first-named shaft, a reciprocating saw, and driving mechanism for the saw operatively connected to the transverse shaft of the gear casing, and means to releasably lock the torque tube in said vertically swinging frame against rotation in any desired rotatably adjusted position of the latter for securing the saw in position to cut vertically or horizontally.

6. The construction defined in claim 5, wherein the vertically swinging frame is provided with an upright post, a tension spring connecting said upright post with a supporting bar carried by the tractor for counterbalancing the swinging frame and parts carried thereby, a rod pivoted to the upright and operable to vertically swing the frame, and a lever for operating said rod carried by the rear portion of the tractor.

RUSH G. BROWN.